(12) United States Patent
Fu et al.

(10) Patent No.: US 9,471,731 B2
(45) Date of Patent: Oct. 18, 2016

(54) ELECTRICAL POWER SYSTEM STABILITY OPTIMIZATION SYSTEM

(71) Applicant: The Boeing Company, Chicago, IL (US)

(72) Inventors: Sheau-Wei Johnny Fu, Bellevue, WA (US); Kamiar J. Karimi, Kirkland, WA (US); Marko D. Jaksic, Blacksburg, VA (US); Bo Zhou, Blacksburg, VA (US); Bo Wen, Blacksburg, VA (US); Paolo Mattavelli, Blacksburg, VA (US); Dushan Boroyevich, Blacksburg, VA (US)

(73) Assignee: THE BOEING COMPANY, Chicago, IL (US)

( * ) Notice: Subject to any disclaimer, the term of this patent is extended or adjusted under 35 U.S.C. 154(b) by 391 days.

(21) Appl. No.: 13/663,884

(22) Filed: Oct. 30, 2012

(65) Prior Publication Data

US 2014/0122050 A1    May 1, 2014

(51) Int. Cl.
| | |
|---|---|
| G06G 7/63 | (2006.01) |
| G06G 7/122 | (2006.01) |
| G06F 17/50 | (2006.01) |
| G06G 7/19 | (2006.01) |
| G01R 23/16 | (2006.01) |
| H02J 3/01 | (2006.01) |
| H02J 3/00 | (2006.01) |
| H02J 3/24 | (2006.01) |
| B60L 1/00 | (2006.01) |
| H02J 4/00 | (2006.01) |

(52) U.S. Cl.
CPC ............. *G06F 17/5022* (2013.01); *B60L 1/00* (2013.01); *H02J 4/00* (2013.01); *B64D 2221/00* (2013.01); *G06F 2217/78* (2013.01); *Y04S 40/22* (2013.01)

(58) Field of Classification Search
None
See application file for complete search history.

(56) References Cited

U.S. PATENT DOCUMENTS

| | | | |
|---|---|---|---|
| 7,508,224 B2 | 3/2009 | Williams | |
| 8,044,672 B2 | 10/2011 | Williams | |
| 2013/0076332 A1 | 3/2013 | Burgos et al. | |
| 2013/0099800 A1 | 4/2013 | Francis et al. | |
| 2014/0032148 A1* | 1/2014 | Verhulst | G01R 27/16 702/65 |

OTHER PUBLICATIONS

H. Zhu, "New Multi Pulse Diode Rectifier Average Models for AC and DC Power Systems Studies," PhD. Thesis, Virginia Polytechnic Institute and State University, Dec. 2005, 193 pages.*
S. Chwirka, "Using the Powerful SABER Simulator for Simulation, Modeling and Analysis of Power Systems, Circuits, and Devices," Workshop on Computers in Power Electronics, 2000, IEEE, pp. 172-176.*

(Continued)

*Primary Examiner* — Aniss Chad
*Assistant Examiner* — David M Rogers
(74) *Attorney, Agent, or Firm* — Yee & Associates, P.C.

(57) ABSTRACT

A method and apparatus for electrical power system stability optimization. An electrical power system comprising source elements and load elements is simulated to generate impedance data, wherein the impedance data identifies an impedance of the electrical power system. A stability profile of the electrical power system is characterized as a function of the impedance data, wherein the stability profile identifies the source elements and load elements to control power generation by the electrical power system to optimize stability of the electrical power system.

21 Claims, 14 Drawing Sheets

(56) References Cited

OTHER PUBLICATIONS

J. Bosworth, et al., "Tailored Excitation for Multivariable Stability-Margin Measurement Applied to the X-31A Nonlinear Simulation," NASA Technical Memorandum 113085, Dryden Flight Research Center, Edwards, California, 20 pages.*
M. Friese, "Multitone Signals with Low Crest Factor," IEEE Transactions on Communications, vol. 45, No. 10, Oct. 1997, pp. 1338-1344.*
K. Louganski, "Modeling and Analysis of a DC Power Distribution System in 21st Century Airlifters," Master's Thesis, Virginia Polytechnic Institute and State University, Sep. 30, 1999, 164 pages.*
J. Schouken, et al., "Design of Multisine Excitations," Internation Conference on Control, 1991, IET, 1991, pp. 638-643.*
M. Wu, et al., "New Spectral Leakage-Removing Method for Spectral Testing of Approximate Sinusoidal Signals," IEEE Transactions on Instrumentation and Measurement, vol. 61, No. 5, May 2012, pp. 1296-1306.*
G. Francis, et al., "An Algorithm and Implementation System for Measuring Impedance in the DQ Domain." Energy Conversion Congress and Exposition (ECCE), IEEE, Sep. 17-22, 2011, pp. 3221-3228.*
Francis, Gerald. "An Algorithm and System for Measuring Impedance in DQ Coordinates." PhD Thesis, Virginia Polytechnic Institute and State University, Jan. 25, 2010, 163 pages.*
Middlebrook, R. David. "Input filter considerations in design and application of switching regulators." IEEE Industry Applications Society Annual Meeting, 1976, pp. 366-382.*
Burgos et al., "On the Ac Stability of High Power Factor Three-Phase Rectifiers," 2010 IEEE Energy Conversion Congress and Exposition, Sep. 2010, pp. 2047-2054.
Francis et al., "An Algorithm and Implementation System for Measuring Impedance in the D—Q Domain," Energy Conversion Congress and Exposition, Sep. 2011, pp. 3221-3228.
MacFarlane et al., "The Generalized Nyquist Stability Criterion and Multivariable Root Loci," International Journal of Control, vol. 25, No. 1, Mar. 1977, pp. 81-127.
Belkhayat, "Stability Criteria for AC Systems with Regulated Loads," Doctoral Thesis, Purdue University, Dec. 1997, 140 pages.
Fernandez et al., "Frequency Response of Switching DC/DC Converters from a Single Simulation in the Time Domain," Applied Power Electronics Conference and Exposition, Mar. 2011, pp. 1846-1851.
Friese, "Multitone Signals with Low Crest Factor," IEEE Transactions on Communications, vol. 45, No. 10, Oct. 1997, pp. 1338-1344.
Boyd, "Multitone Signals with Low Crest Factor," IEEE Transactions on Circuits and Systems, vol. 33, No. 10, Oct. 1986, pp. 1018-1022.
Wallen et al, "United States Laboratory Element Electrical Power System Verification Approach," Journal of Propulsion and Power, vol. 13, No. 4, Jul.-Aug. 1997, pp. 570-573.
"The Language of Technical Computing," The MathWorks, Inc., copyright 1994-2012, 2 pages, accessed Oct. 15, 2012 http://www.mathworks.com/products/matlab.
"Simulation and Model-Based Design," The MathWorks, Inc., copyright 1994-2012, 2 pages, accessed Oct. 15, 2012 http://www.mathworks.com/products/simulink.
"SimPowerSystems—Model and Simulate Electrical Power Systems," The MathWorks, Inc., copyright 1994-2012, 1 page, accessed Oct. 15, 2012 http://www.mathworks.com/products/simpower.
"SIMetrix/SIMPLIS—Circuit Simulation Software for Power Electronics Designers," Simplis Technologies, copyright 2012, 1 page, accessed Oct. 30, 2012, http://www.simplistechnologies.com/.
"PLECS Unleashed!", Simulation of Electric Circuits at System Level, Plexim Gmbh, copyright 2012, 2 pages, accessed Oct. 30, 2012, http://www.plexim.com/.
"PSIM Software by Powersim Inc.," What's New, Powersim Inc., copyright 2012, 1 page, accessed Oct. 30, 2012, http://www.powersimtech.com/.
Burgos et al., "Method of Evaluating and Ensuring Stability of AC/DC Power Systems", U.S. Appl. No. 13/608,213, filed Sep. 10, 2012, 48 pages. (01640647AA).
Francis et al., "Algorithm and Implementation System for Measuring Impedance in the D—Q Domain", U.S. Appl. No. 13/618,513, filed Sep. 14, 2012, 50 pages. (01640648AA).
Canadian Intellectual Property Office Examination Search Report, dated Mar. 5, 2015, regarding Application No. 2,823,985, 4 pages.

* cited by examiner

ELECTRICAL POWER SYSTEM STABILITY OPTIMIZATION SYSTEM

BACKGROUND INFORMATION

1. Field

The present disclosure relates generally to systems and methods for analyzing the stability of electrical power systems. More particularly, the present disclosure relates to a system and method for generating impedance data for an electrical power system and using the impedance data to optimize the stability of the electrical power system.

2. Background

Aircraft may employ various electronic devices and systems for performing various functions on the aircraft. Power for the electronic devices and systems on an aircraft may be provided by an aircraft electrical power system. The aircraft electrical power system may include a number of generators along with various power distribution and conversion systems. For example, the electrical power system on an aircraft may include a number of generators driven by the aircraft engines.

The stability of an electrical power system may be defined as the ability of the system to regain a normal state of equilibrium after being subjected to a disturbance. It is desirable that an electrical power system on an aircraft may be designed for stability.

Many of the electrical loads on an aircraft may use regulated power electronics in order to improve efficiency, power quality, and power density. Such electrical loads may affect the stability of the electrical power system on an aircraft in undesired ways.

It may be desirable to optimize the electrical power system on an aircraft to ensure stability in the power efficiency, density and quality. Furthermore, failure to optimize the electrical power systems on aircraft may increase costs. Less than optimal power systems may be overdesigned, heavier, and have larger volumetric stowage requirements. Therefore, aircraft equipped with such less than optimal power systems may use more fuel during operation. In this era of ever increasing fuel costs, having solutions that address this problem have become even more important. Similarly, less than optimal power systems may require more frequent maintenance and components of such systems may need to be repaired and replaced more often. Therefore, such systems may have higher lifecycle costs.

Optimizing the stability of the electrical power system on an aircraft may present several technical problems. A first technical problem may be the problem of characterizing the stability profiles of numerous possible electrical power system designs in order to identify an optimal electrical power system for an aircraft. A second technical problem may be the problem of accurately characterizing the stability profile of an electrical power system in order to accurately identify a stable electrical power system for an aircraft. A third technical problem may be the problem of simultaneously solving the first technical problem and the second technical problem in a manner such that the stability profiles of numerous possible electrical power system designs may be characterized efficiently without sacrificing the accuracy of such characterizations.

Currently available systems and methods for analyzing the stability of electrical power system designs may be limited and may not provide solutions to the technical problem of optimizing the stability of an electrical power system on an aircraft. The analysis of the stability of an electrical power system may be performed only partially by current commercially available simulation software. For example, some currently available simulation software products may only be able to identify the direct current impedance of direct current to direct current converters. Other currently available simulation software products may be able to identify alternating current impedance of a system, but only under some specific assumptions and limitations. For example, some simulation software products may be able to identify alternating current impedance under the assumption of balanced line voltages and with prior knowledge of system frequency. Such a simulation software product may also require injecting a sinusoidal component into the simulation for each frequency where impedances are identified.

Current approaches may not integrate stability analysis methods and may lack a general and comprehensive approach to stability analysis. For example, current approaches may require fine tuning of several parameters for each specific case. Another drawback of current approaches may be the need for extensive manual data extraction by a user from simulation models based on various user judgments.

Accordingly, it would be beneficial to have a method and apparatus that takes into account one or more of the issues discussed above as well as possibly other issues.

SUMMARY

An illustrative embodiment of the present disclosure provides an apparatus comprising an electrical power system simulator and a stability analyzer. The electrical power system simulator is configured to generate impedance data from an electrical power system simulation model of an electrical power system comprising source elements and load elements. The impedance data identifies an impedance of the electrical power system. The stability analyzer is in communication with the electrical power system simulator and is configured to characterize a stability profile of the electrical power system as a function of the impedance data, wherein the stability profile identifies the source elements and the load elements to control power generation by the electrical power system to optimize stability of the electrical power system.

Another illustrative embodiment of the present disclosure provides a method for electrical power system stability optimization. An electrical power system comprising source elements and load elements is simulated to generate impedance data, wherein the impedance data identifies an impedance of the electrical power system. A stability profile of the electrical power system is characterized as a function of the impedance data, wherein the stability profile identifies the source elements and load elements to control power generation by the electrical power system to optimize stability of the electrical power system.

Another illustrative embodiment of the present disclosure provides a method for identifying an impedance of an electrical power system. The electrical power system comprising source elements and load elements is simulated by a processor unit. The electrical power system is characterized by a line frequency at an interface between the source elements and the load elements. Perturbation signals are injected at a plurality of perturbation frequencies in an electrical power system simulation model of the electrical power system. Impedance data is generated by the processor unit using a Fast Fourier transform calculated over a window of time. The impedance data identifies the impedance of the electrical power system. The plurality of perturbation frequencies are selected by the processor unit such that the line frequency and the plurality of perturbation frequencies are integer multiples of a frequency of the window whose period is equal to the width, in time, of the time window over which the sampling for the Fast Fourier is conducted.

Another illustrative embodiment provides a system for optimizing an electrical power system on an aircraft comprising an impedance identifier and a stability analyzer. The impedance identifier is configured to generate impedance data for the electrical power system on the aircraft, wherein the electrical power system on the aircraft comprises source elements and load elements, and wherein the impedance data identifies an impedance of the electrical power system on the aircraft. The stability analyzer is in communication with the impedance identifier and is configured to characterize a stability profile of the electrical power system on the aircraft as a function of the impedance data, wherein the stability profile identifies the source elements and load elements to control power generation by the electrical power system on the aircraft to optimize stability of the electrical power system on the aircraft.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

Figure 1:
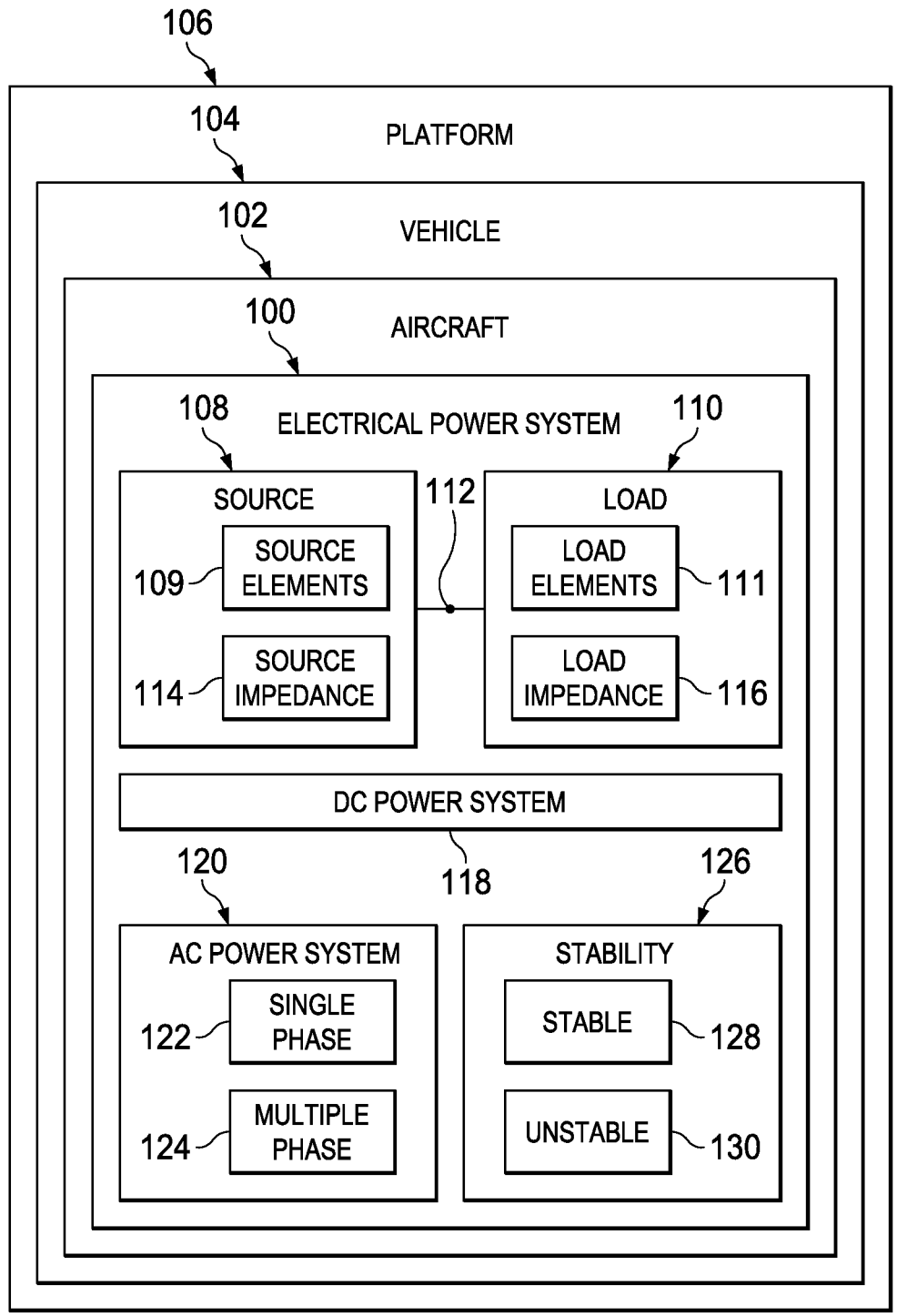
FIG. 1 is an illustration of a block diagram of an electric power system in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that it may be desirable to optimize the stability of an electrical power system for use on an aircraft or other vehicle. However, currently available systems and methods for analyzing the stability of an electrical power system may be limited and may not provide solutions to the technical problem of optimizing an electrical power system.

The illustrative embodiments provide a system and method that provides novel and inventive technical solutions to the technical problem of optimizing the stability of an electrical power system. For example, the illustrative embodiments provide a technical solution to the technical problem of characterizing the stability profiles of numerous electrical power system designs by providing integrated electrical power system simulation and stability analysis functions. An electrical power system simulator may be configured to generate impedance data for electrical power systems comprising source elements and load elements. A stability analyzer may be in communication with the electrical power system simulator and may be configured to characterize a stability profile of the electrical power system as a function of the impedance data. The stability profile may be used to identify the source elements and load elements for optimized stability of the electrical power system.

The illustrative embodiments provide another technical solution to the technical problem of characterizing the stability profiles of numerous electrical power system designs by automatically selecting and controlling the characteristics of various parameters of the electrical power system simulation. For example, illustrative embodiments may automatically select a plurality of perturbation frequencies to inject into the electrical power system simulation to identify the impedance of an electrical power system. Illustrative embodiments may inject the plurality of perturbation frequencies into the electrical power system simulation simultaneously in the form of a multi-tone signal.

The illustrative embodiments may provide a technical solution to the technical problem of accurately characterizing the stability profile of an electrical power system by automatically selecting or adjusting the characteristics of parameters of the electrical power system simulation based on identified characteristics of the electrical power system to improve the accuracy of the impedance data generated by the electrical power system simulation. For example, illustrative embodiments may automatically select or adjust the perturbation frequencies injected into the electrical power system simulation, a Fast Fourier transform window used to generate the impedance data, or both, based on a line frequency characteristic of the electrical power system to improve the accuracy of the impedance data generated by the electrical power system simulation.

The illustrative embodiments may provide a technical solution to the technical problem of efficiently characterizing the stability profiles of numerous electrical power system designs without sacrificing the accuracy of such characterizations by, for example, automatically adjusting the plurality of perturbation frequencies injected into an electrical power system simulation simultaneously in the form of a multi-tone signal such that the plurality of perturbation frequencies in the multi-tone signal do not overlap in a manner that may affect the accuracy of the impedance data generated by the electrical power system simulation. This technical solution may be used to characterize the stability profiles of electrical power systems more rapidly without reducing the accuracy of such characterizations.

Turning now to FIG. 1, an illustration of a block diagram of an electric power system is depicted in accordance with an illustrative embodiment. In this example, electrical power system 100 may provide electrical power for aircraft 102.

Aircraft 102 may be any type of aircraft. For example, without limitation, aircraft 102 may be a fixed wing, rotary wing, or lighter than air aircraft. Aircraft 102 may be configured for carrying passengers, cargo, both passengers and cargo, or may be used for performing any other operation or mission. Aircraft 102 may be operated by an airline, a military unit, or any other private or government entity.

Aircraft 102 is an example of vehicle 104 for which power may be provided by electrical power system 100. Electrical power system 100 may provide power for vehicles other than aircraft 102. For example, without limitation, vehicle 104 may be any vehicle that is configured for travelling through the air, in space, on land, on the surface of water, underwater, or in any other operating environment or combination of environments.

Vehicle 104 is an example of platform 106 for which power may be provided by electrical power system 100. Electrical power system 100 may provide power for platforms other than vehicle 104. For example, without limitation, platform 106 may include any fixed or mobile platform.

Electrical power system 100 may include source 108 and load 110. Source 108 may include various source elements 109 for generating, converting, and distributing electrical power. For example, without limitation, source elements 109 may include various systems, devices, or circuit components or configurations for generating, converting, and distributing electrical power. Load 110 may include any number of load elements 111. Load elements 111 may include various types of electrical loads and various components of such loads. For example, without limitation, load elements 111 may include various components of loads including regulated power electronics for improving efficiency, power quality, power density, or other characteristics of such loads. Load 110 may be connected to source 108 at interface 112.

Source 108 may be characterized by source impedance 114. Load 110 may be characterized by load impedance 116. Source impedance 114 and load impedance 116 may be identified at interface 112.

Electrical power system 100 may be direct current (DC) power system 118 or alternating current (AC) power system 120. Alternating current power system 120 may be single phase 122 or multiple phase 124. For example, without limitation, alternating current power system 120 may be a three phase power system.

Electrical power system 100 may be characterized by stability 126. Stability 126 may be defined as the ability of electrical power system 100 to regain a normal state of equilibrium after being subjected to a disturbance. Electrical power system 100 may be characterized as stable 128 or unstable 130.

Figure 2:
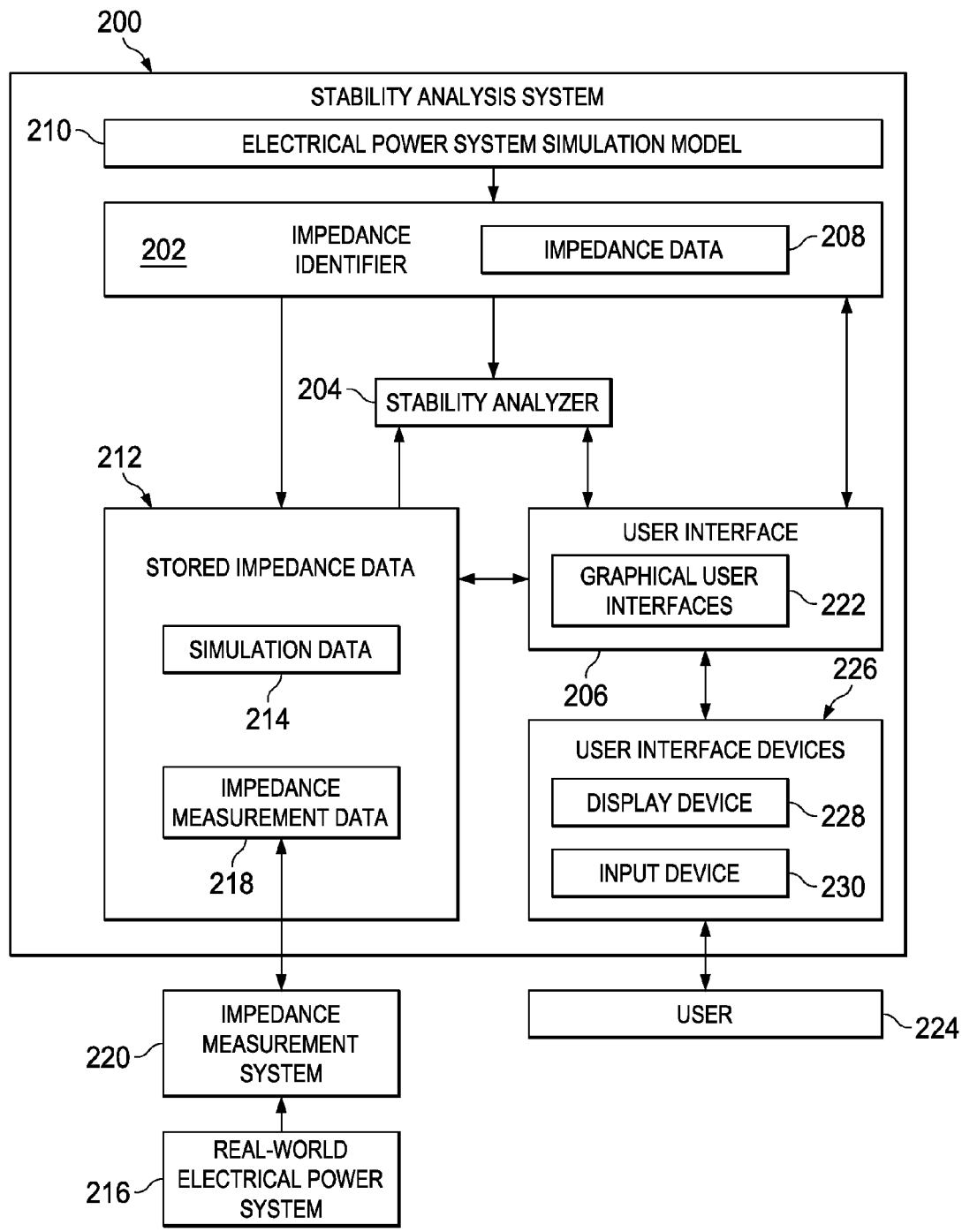
FIG. 2 is an illustration of a block diagram of a stability analysis system in accordance with an illustrative embodiment.

Turning now to FIG. 2, an illustration of a block diagram of a stability analysis system is depicted in accordance with an illustrative embodiment. In this example, stability analysis system 200 may be used to identify stability 126 of electrical power system 100 in FIG. 1. Stability analysis system 200 may include impedance identifier 202, stability analyzer 204, and user interface 206.

Impedance identifier 202 may be configured to generate impedance data 208 for an electrical power system by running a simulation of the electrical power system using electrical power system simulation model 210. Impedance data 208 identifies the impedance of the electrical power system modeled by electrical power system simulation model 210. Impedance data 208 generated by impedance identifier 202 may be stored as stored impedance data 212.

Stability analyzer 204 may be configured to analyze the stability of an electrical power system using impedance data 208 generated by impedance identifier 202. Stability analyzer 204 may also be configured to analyze the stability of an electrical power system using stored impedance data 212. For example, without limitation, stored impedance data 212 may include simulation data 214. Simulation data 214 may include impedance data 208 generated by impedance identifier 202, impedance data generated by a system or method for simulating an electrical power system other than impedance identifier 202, or both.

Stability analyzer 204 also may be configured to analyze the stability of real-world electrical power system 216 using impedance measurement data 218. Stored impedance data 212 may include impedance measurement data 218. Impedance measurement data 218 may identify the impedance of real-world electrical power system 216. Impedance measurement data 218 may be generated by impedance measurement system 220. Impedance measurement system 220 may be any appropriate system using any appropriate method for identifying the impedance of real-world electrical power system 216.

User interface 206 may include various graphical user interfaces 222. For example, without limitation, user interface 206 may include interfaces for controlling the operation of impedance identifier 202, stability analyzer 204, or both, by user 224. User interface 206 also may include displays of plots of impedance data 208, displays of plots of stored impedance data 212, or both. User interface 206 also may include displays of the stability analysis provided by stability analyzer 204.

User interface 206 may be displayed or otherwise presented to user 224 on user interface devices 226. For example, without limitation, user interface devices 226 may include display device 228 for displaying graphical user interfaces 222 to user 224. User interface devices 226 also may be configured to receive input from user 224 as user 224 interacts with graphical user interfaces 222 displayed on user interface devices 226. For example, user interface devices 226 may include input device 230 for receiving input from user 224.

Figure 3:
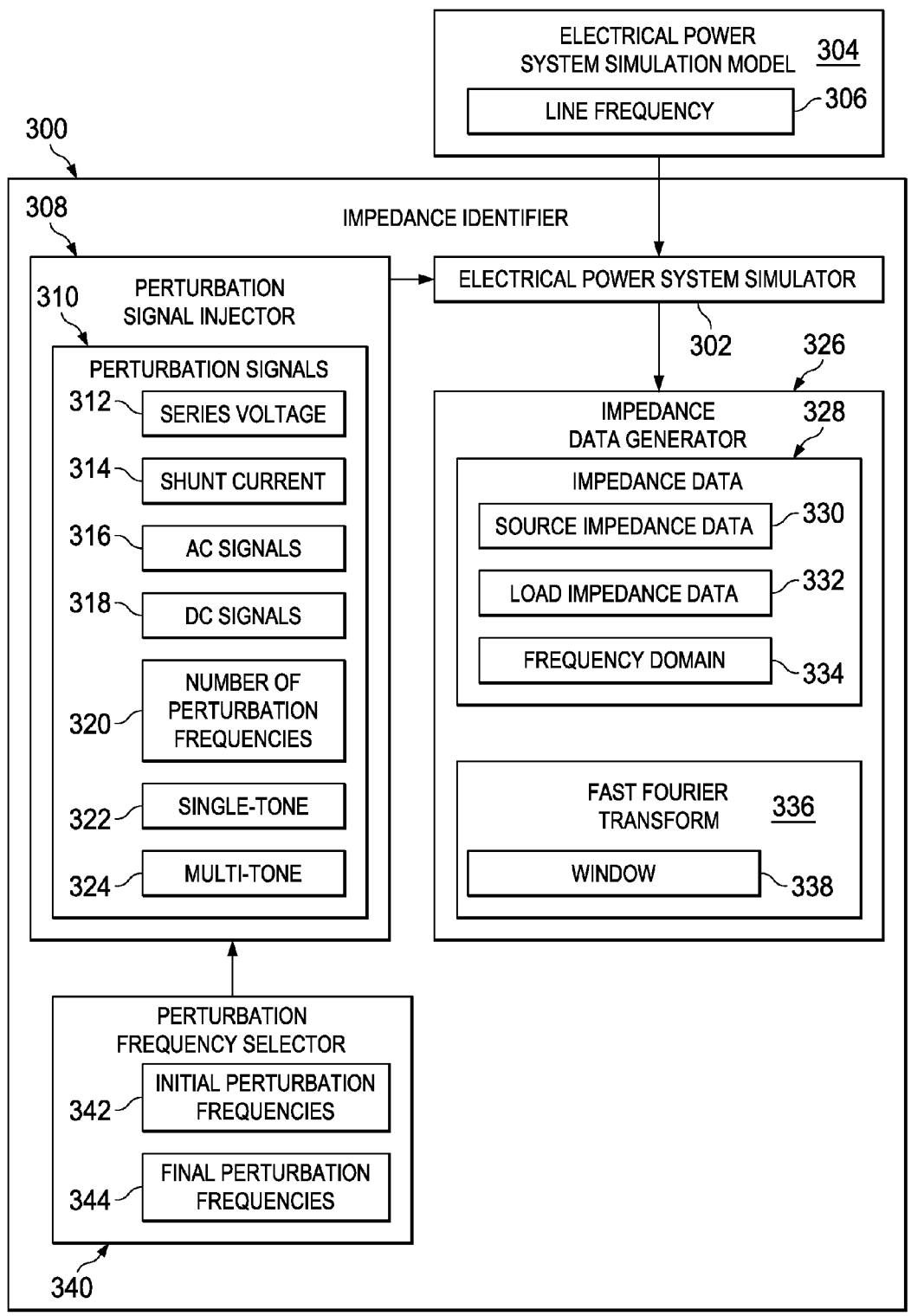
FIG. 3 is an illustration of a block diagram of an impedance identifier in accordance with an illustrative embodiment.

Turning now to FIG. 3, an illustration of a block diagram of an impedance identifier is depicted in accordance with an illustrative embodiment. In this example, impedance identifier 300 is an example of one implementation of impedance identifier 202 in FIG. 2.

Impedance identifier 300 may be configured to include electrical power system simulator 302. Electrical power system simulator 302 may be configured to run a simulation of an electrical power system described by electrical power system simulation model 304.

The electrical power system described by electrical power system simulation model 304 may be characterized by line frequency 306. Line frequency 306 may be defined as the steady state frequency of the signal on a line in an electrical power system at which the impedance of the electrical power system is identified by impedance identifier 300. For example, without limitation, line frequency 306 may be the steady state frequency of the signal at the interface between a source and a load in the electrical power system at which the impedance of the electrical power system is identified by impedance identifier 300.

Impedance identifier 300 may include perturbation signal injector 308. Perturbation signal injector 308 may be configured for injecting perturbation signals 310 in electrical power system simulator 302. For example, without limitation, perturbation signals 310 may be injected at the interface between a source and a load in the electrical power system being simulated by electrical power system simulator 302. Perturbation signals 310 may be injected in electrical power system simulator 302 as series voltage 312 or shunt current 314. Perturbation signals 310 may include alternating current (AC) signals 316 or direct current (DC) signals 318, as appropriate.

Perturbation signals 310 may include number of perturbation frequencies 320. Perturbation signals 310 may be single-tone 322 or multi-tone 324. When perturbation signals 310 are single-tone 322, each of perturbation signals 310 injected in electrical power system simulator 302 includes a single one of number of perturbation frequencies 320. When perturbation signals 310 are multi-tone 324, a single one of perturbation signals 310 injected in electrical power system simulator 302 may include a plurality of number of perturbation frequencies 320.

Impedance data generator 326 may be configured to generate impedance data 328 from electrical power system simulator 302 as affected by the injection of perturbation signals 310. Impedance data 328 may identify an impedance of the electrical power system defined by electrical power system simulation model 304. Impedance data 328 may include source impedance data 330 and load impedance data 332. Impedance data 328 may be provided in frequency domain 334.

Impedance data 328 may be generated by impedance data generator 326 in a known manner using Fast Fourier transform 336. Fast Fourier transform 336 may be calculated over a known period of time defined by window 338.

Number of perturbation frequencies 320 may be selected by perturbation frequency selector 340. For example, number of perturbation frequencies 320 may be selected by perturbation frequency selector 340 such that line frequency 306 and number of perturbation frequencies 320 are integer multiples of a frequency of window 338. Number of perturbation frequencies 320 may be selected by perturbation frequency selector 340 such that number of perturbation frequencies 320 in a one of perturbation signals 310 that is multi-tone 324 do not overlap.

Perturbation frequency selector 340 may be configured to select initial perturbation frequencies 342 and to adjust initial perturbation frequencies 342 to form final perturbation frequencies 344. In this case, final perturbation frequencies 344 are number of perturbation frequencies 320 of perturbation signals 310 injected in electrical power system simulator 302.

Various functions of impedance identifier 300 may be implemented using commercially available simulation software. For example, without limitation, various functions of impedance identifier 300 may be implemented using SIMULINK\MATLAB software with the use of SIMPOWERSYSTEMS toolbox or any other appropriate simulation software. MATLAB with SIMPOWERSYSTEMS toolbox offers several different solvers and is a commonly used software tool for time-domain simulations of different switching power converter circuits. For example, simulation blocks for injecting perturbation signals 310 and generating impedance data 328 may be built separately and put into the SIMULINK library.

Figure 4:
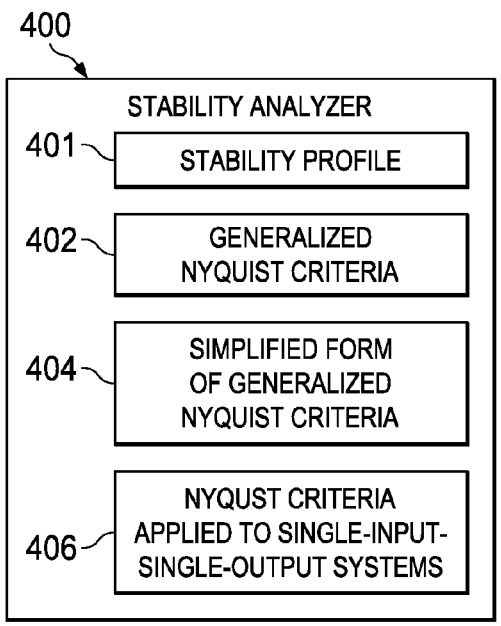
FIG. 4 is an illustration of a block diagram of a stability analyzer in accordance with an illustrative embodiment.

Turning now to FIG. 4, an illustration of a block diagram of a stability analyzer is depicted in accordance with an illustrative embodiment. In this example, stability analyzer 400 is an example of one implementation of stability analyzer 204 in FIG. 2.

Stability analyzer 400 may be configured to characterize stability profile 401 of an electrical power system as a function of impedance data for the electrical power system. For example, stability profile 401 may be used to identify the source elements and load elements to control power generation by an electrical power system to optimize the stability of the electrical power system. The stability of an electrical power system may be optimized if the electrical power system is both stable and satisfies any other desired characteristics for the electrical power system.

Stability analyzer 400 may be configured to characterize stability profile 401 of the electrical power system as a function of the impedance data for the electrical power system. Stability analyzer 400 may be configured to characterize stability profile 401 of an electrical power system using impedance data for the electrical power system and a number of criteria. For example, without limitation, stability analyzer 400 may be configured to analyze the stability of an electrical power system using generalized Nyquist criteria 402, simplified form of generalized Nyquist criteria 404, or Nyquist criteria applied to single-input-single-output systems 406.

Figure 5:
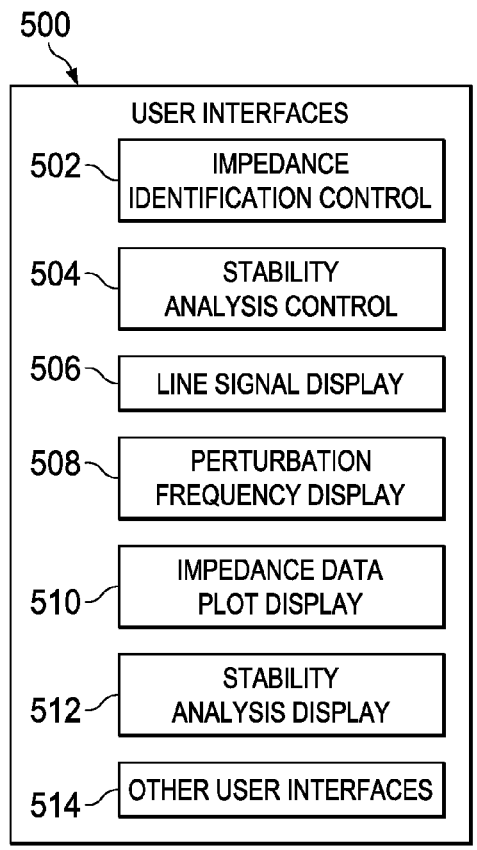
FIG. 5 is an illustration of a block diagram of user interfaces in accordance with an illustrative embodiment.

Turning now to FIG. 5, an illustration of a block diagram of user interfaces is depicted in accordance with an illustrative embodiment. In this example, user interfaces 500 are examples of implementations of user interface 206 in FIG. 2.

For example, without limitation, user interfaces 500 may include interfaces for impedance identification control 502, stability analysis control 504, line signal display 506, perturbation frequency display 508, impedance data plot display 510, stability analysis display 512, other user interfaces 514, or various combinations of user interfaces. User interfaces 500 for impedance identification control 502 may be configured to provide a user with various options for controlling the generation of simulated impedance data by a stability analysis system in accordance with an illustrative embodiment. User interfaces 500 for stability analysis control 504 may be configured to provide a user with various options for controlling the stability analysis system to perform a stability analysis using either impedance measurement data or impedance data from simulation. Line signal display 506 may display the line signal at a point in an electrical power system simulation so that a user may confirm that the simulation has reached steady state before injecting perturbation signals into the simulation. Perturbation frequency display 508 may indicate the perturbation frequencies that will be injected in the simulation to generate impedance data.

The illustrations of FIGS. 2-5 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 6:
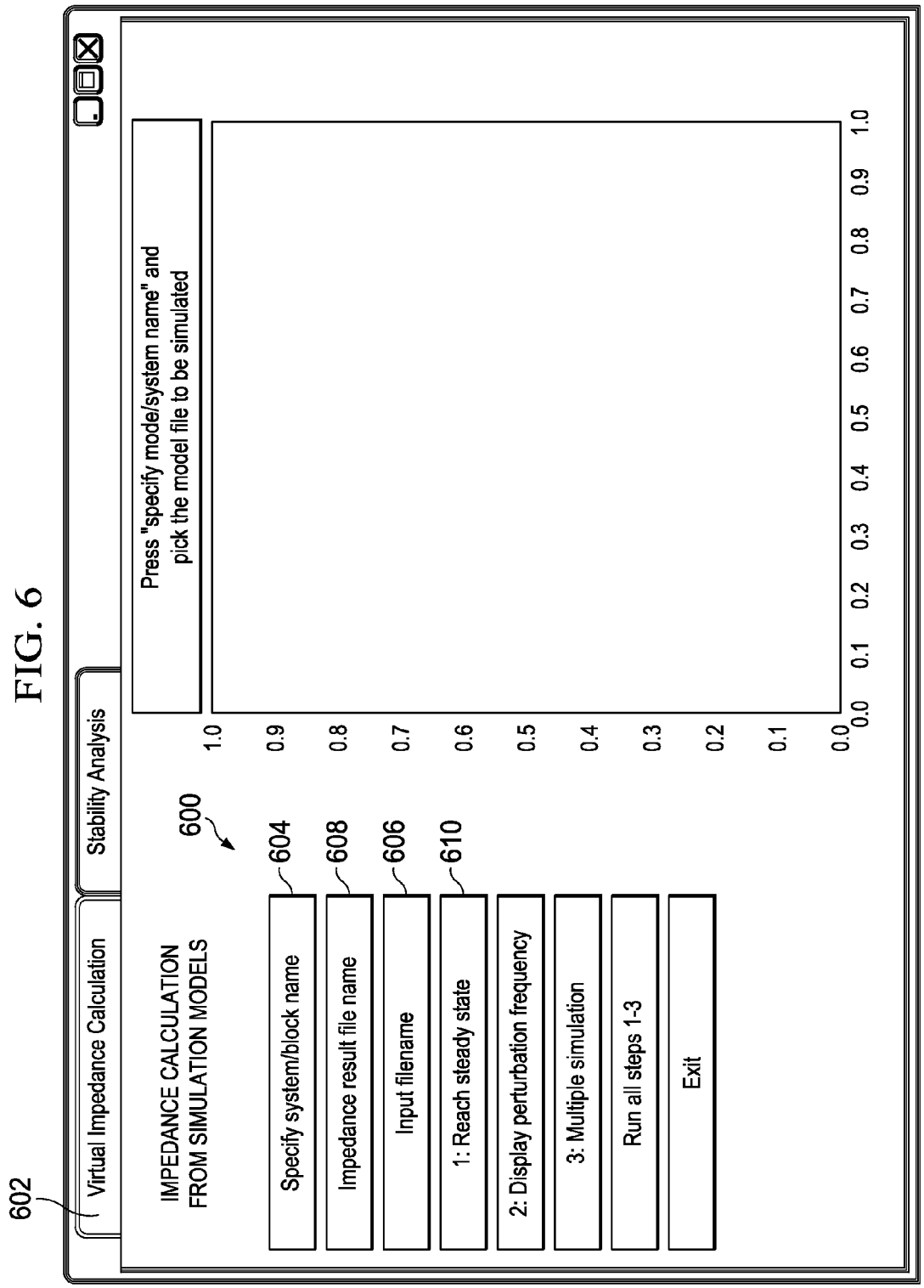
FIG. 6 is an illustration of a user interface for controlling impedance identification in accordance with an illustrative embodiment.

Turning now to FIG. 6, an illustration of a user interface for controlling impedance identification is depicted in accordance with an illustrative embodiment. In this example, user interface 600 is an example of one implementation of user interface 206 in FIG. 2. More particularly, in this example, user interface 600 is an example of one implementation of impedance identification control 502 in FIG. 5.

User interface 600 is configured to provide a user with various options for controlling the generation of simulated impedance data by a stability analysis system in accordance with an illustrative embodiment. For example, without limitation, a user may access user interface 600 by selecting tab 602.

A user may select button 604 on user interface 600 to identify an electrical power system simulation model to use for generating the impedance data. The user may select button 606 on user interface 600 to enter or select a file name for the generated impedance data. The file name for the generated impedance data may be displayed at 608 on user interface 600. The user may then select button 610 on user interface 600 to begin the simulation.

Figure 7:
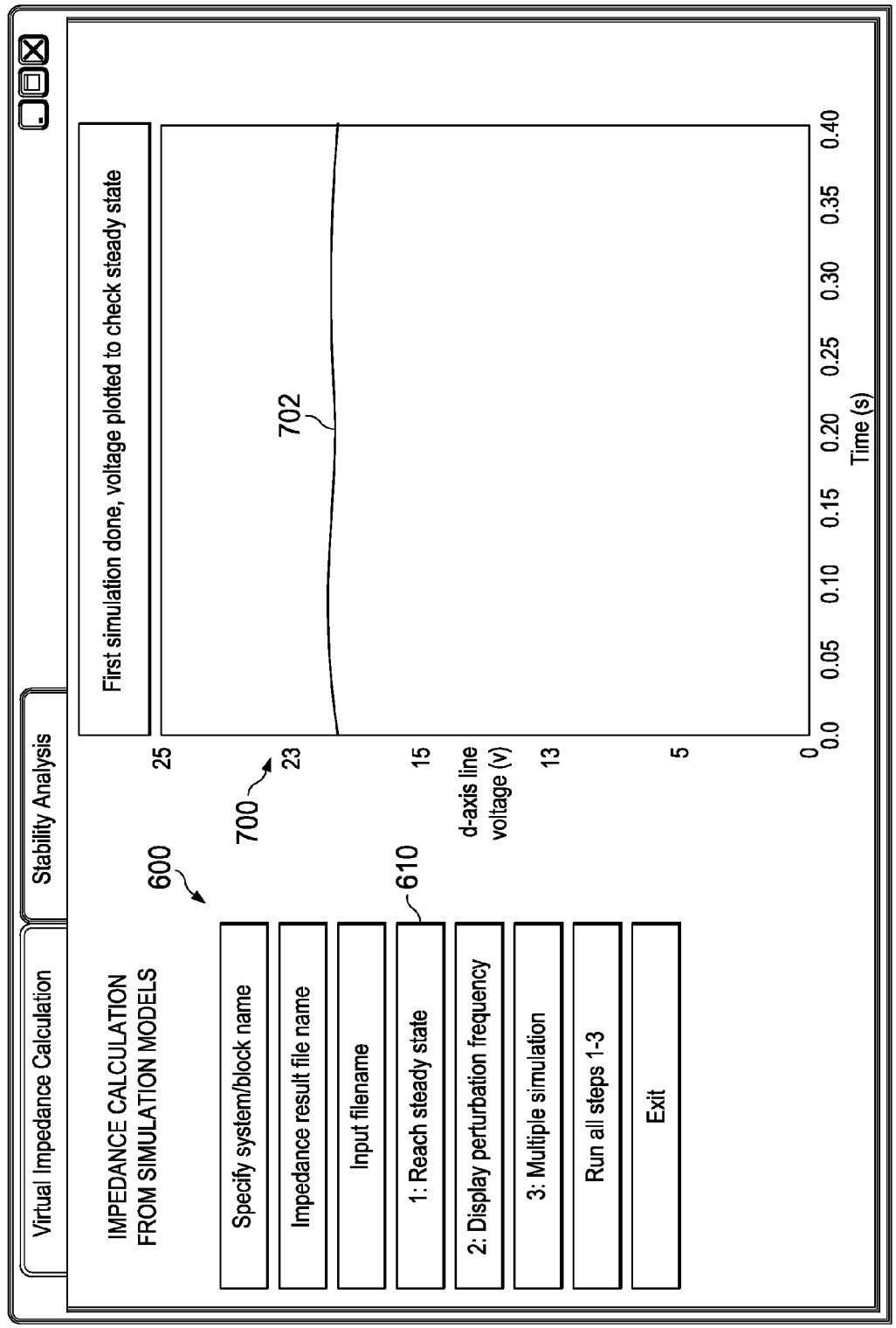
FIG. 7 is an illustration of a line signal display during system startup in accordance with an illustrative embodiment.

Turning now to FIG. 7, an illustration of a line signal display during system startup is depicted in accordance with an illustrative embodiment. In this example, line signal display 700 is an example of one implementation of user interface 206 in FIG. 2. More particularly, in this example, line signal display 700 is an example of one implementation of line signal display 506 in FIG. 5.

Line signal display 700 may be displayed to a user in response to the user selecting button 610 on user interface 600 to begin a simulation. After the simulation reaches a specified time, line signal plot 702 is displayed in line signal display 700. The specified time may be selected to allow the simulation to stabilize after the simulation is started before line signal plot 702 is displayed. For example, without limitation, the specified time may be specified by the user.

Line signal plot 702 may be a plot of a signal at the location in the simulation at which perturbation signals will be injected in the simulation and at which the impedance data will be determined. For example, without limitation, line signal plot 702 may be a d-axis voltage signal plot for simulated alternating current systems or a direct current voltage signal plot for simulated direct current systems.

A user may view line signal plot 702 in line signal display 700 to confirm that the simulation has reached steady state before injecting perturbation signals into the simulation. The user may change the simulation parameters if line signal plot 702 indicates that the simulation has not reached steady state.

Figure 8:
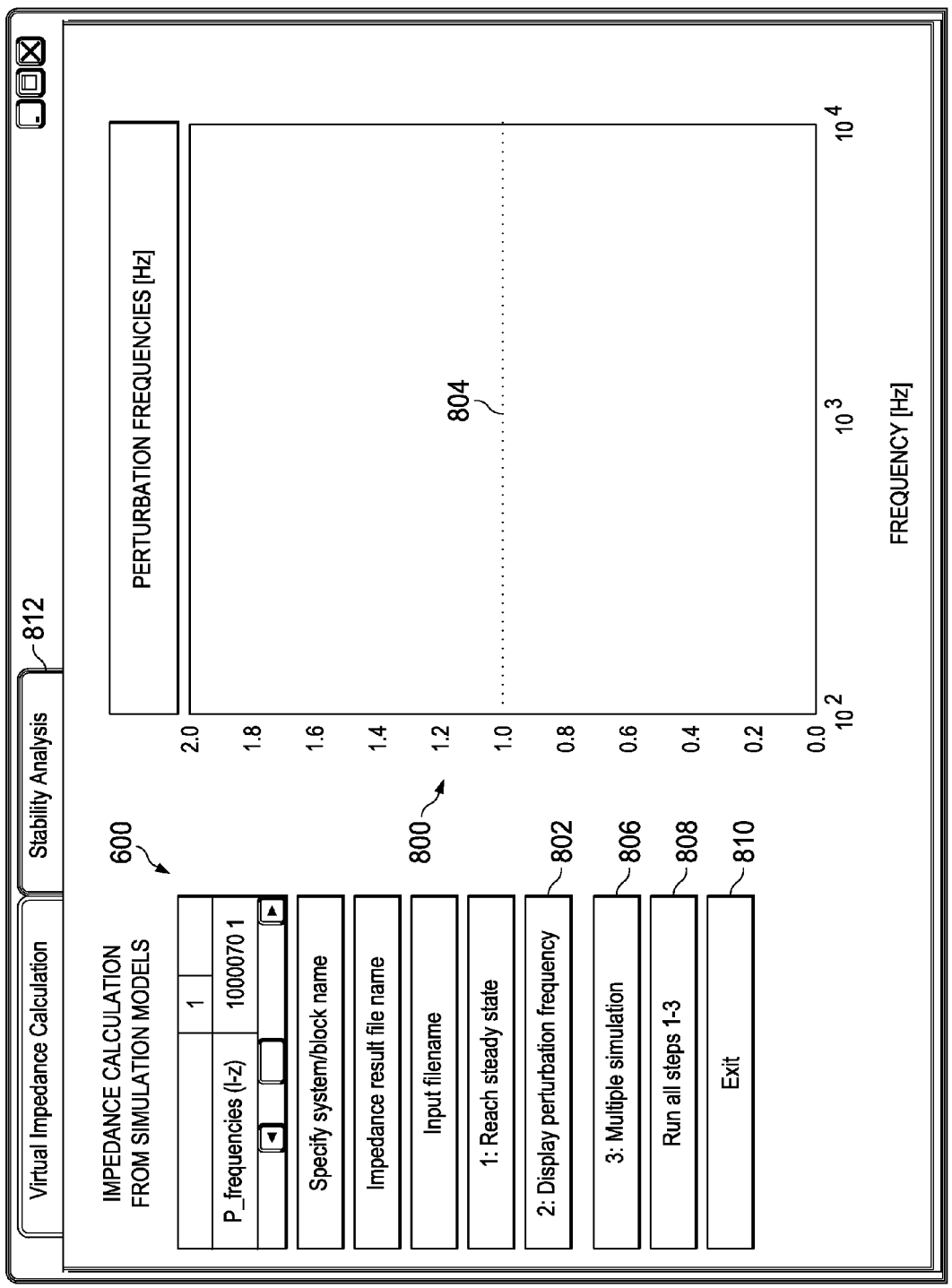
FIG. 8 is an illustration of a perturbation frequency display in accordance with an illustrative embodiment.

Turning now to FIG. 8, an illustration of a perturbation frequency display is depicted in accordance with an illustrative embodiment. In this example, perturbation frequency display 800 is an example of one implementation of user interface 206 in FIG. 2. More particularly, perturbation frequency display 800 is an example of one implementation of perturbation frequency display 508 in FIG. 5.

Perturbation frequency display 800 may be displayed in response to a user selecting button 802 in user interface 600. Perturbation frequency display 800 indicates the perturbation frequencies that will be injected in the simulation to generate the impedance data. For example, without limitation, the perturbation frequencies may be indicated by points 804 in perturbation frequency display 800. The perturbation frequencies indicated in perturbation frequency display 800 may be selected automatically by the stability analysis system. Optionally, a user may change the perturbation frequencies to be injected in the simulation.

After reviewing the perturbation frequencies in perturbation frequency display 800, the user may select button 806 in user interface 600 to proceed with the simulation. For example, in response to selecting button 806, perturbation signals at the selected perturbation signal frequencies may be injected into the simulation and impedance data generated. The generated impedance data may be saved to the file identified previously. Alternatively, a user may select button 808 in user interface 600 to automatically run through the steps of starting the simulation and allowing the simulation to reach steady state, selecting the perturbation signal frequencies, and injecting the perturbation signals and generating and saving the impedance data without any additional user input.

After the impedance data is generated and saved, a user may select button 810 to exit. Alternatively, the user may select tab 812 to perform a stability analysis using the generated impedance data.

Figure 9:
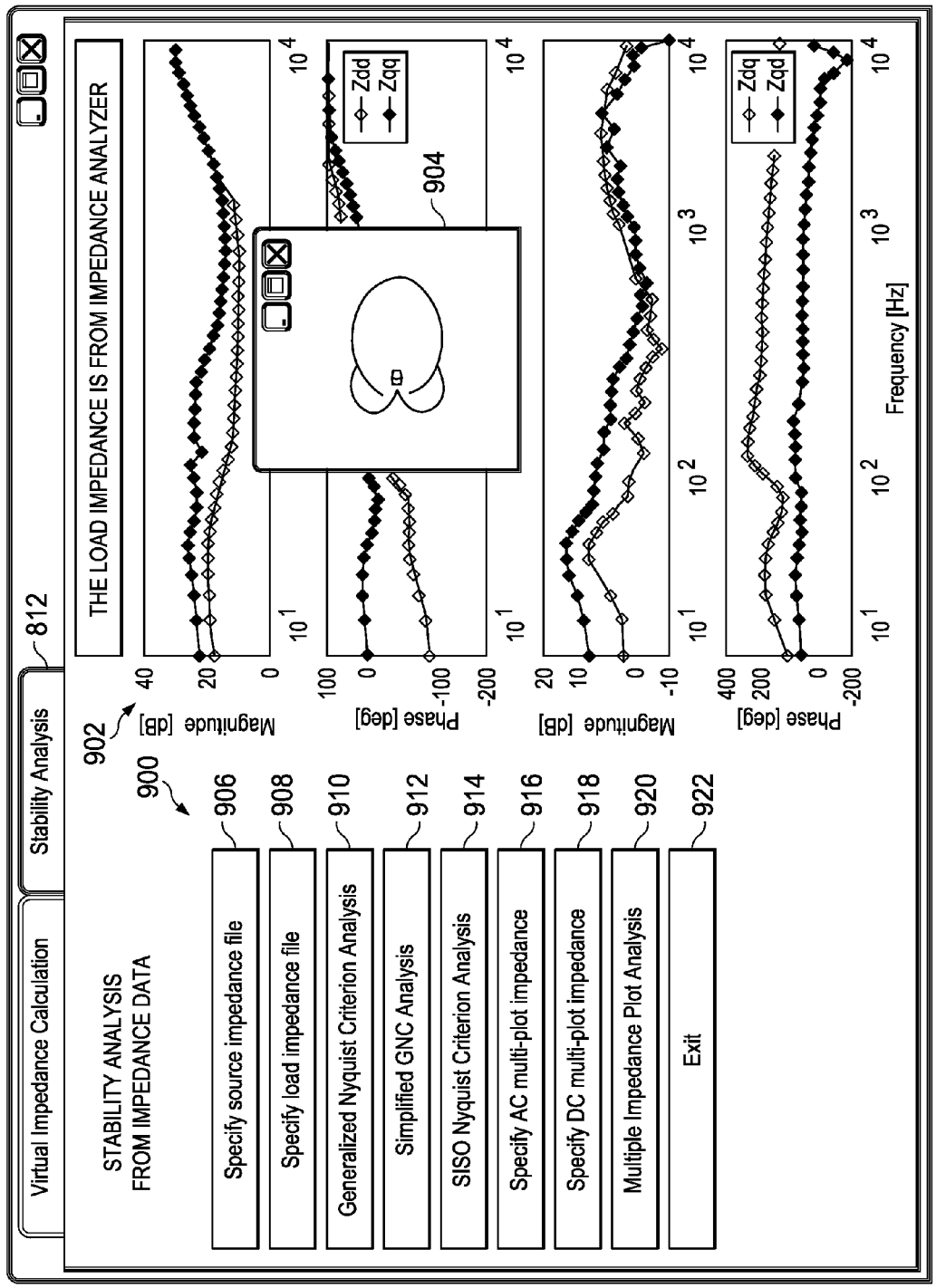
FIG. 9 is an illustration of a user interface for controlling stability analysis, an impedance data plot display, and a stability analysis display in accordance with an illustrative embodiment.

Turning now to FIG. 9, an illustration of a user interface for controlling stability analysis, an impedance data plot display, and a stability analysis display is depicted in accordance with an illustrative embodiment. In this example, user interfaces 900, 902, and 904 are examples of implementations of user interface 206 in FIG. 2. More particularly, in this example, user interface 900 is an example of one implementation of stability analysis control 504 in FIG. 5. User interface 902 is an example of one implementation of impedance data plot display 510 in FIG. 5. User interface 904 is an example of one implementation of stability analysis display 512 in FIG. 5.

User interface 900 may be configured to provide a user with various options for controlling a stability analysis system in accordance with an illustrative embodiment to perform a stability analysis using either impedance measurement data or impedance data from simulation. For example, a user may access user interface 900 by selecting tab 812 to perform a stability analysis.

A user may select buttons 906 and 908 in user interface 900 to identify the impedance data that will be used to perform the stability analysis. The impedance data may be from experiment or from simulation. For example, the user may select button 906 to identify a file for source impedance data. The user may select button 908 to identify a file for load impedance data.

After identifying the impedance data to be used, the user may select button 910 to perform a stability analysis using Generalized Nyquist Criterion. The user may select button 912 to perform a stability analysis using a simplified form of the Generalized Nyquist Criterion. For example, the simplified form of the Generalized Nyquist Criterion may be used for the stability analysis of AC systems with unity-power factor loads. The user may select button 914 to perform a stability analysis using Nyquist criteria applied to single-input-single-output systems.

The impedance data used in the stability analysis may be displayed as plots in user interface 902. Plotting multiple impedances on the same graph may enable better understanding of impedance comparisons and changes under different operating conditions. In this example, the user may select button 916 in user interface 900 to specify AC multi-plot impedance displayed in user interface 902. The user may select button 918 in user interface 900 to specify DC multi-plot impedance displayed in user interface 902. The user may select button 920 in user interface 900 to perform multiple impedance plot analysis.

The stability analysis may be performed by inspection on eigenvalue trajectories in the complex plane for AC systems or on the trajectory of the return ratio for DC system or for the simplified criteria. In this example, the appropriate plot for performing the stability analysis may be displayed in user interface 904. The user may select button 922 in user interface 900 to exit.

Figure 10:
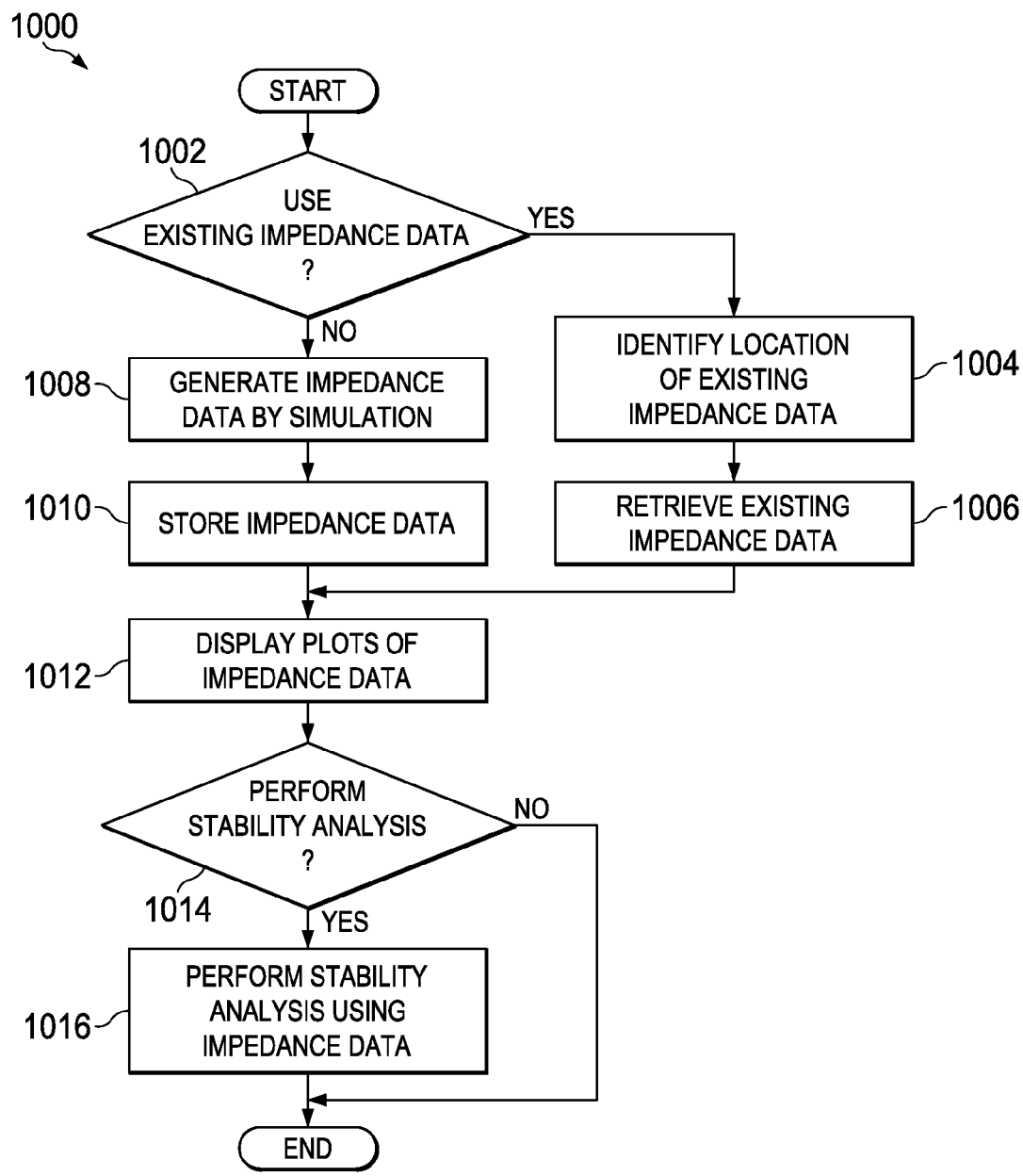
FIG. 10 is an illustration of a flowchart of a process for impedance identification and stability analysis in accordance with an illustrative embodiment.

Turning now to FIG. 10, an illustration of a flowchart of a process for impedance identification and stability analysis is depicted in accordance with an illustrative embodiment. In this example, process 1000 may be implemented, for example, in stability analysis system 200 in FIG. 2.

It first may be determined whether to use existing impedance data (operation 1002). If existing impedance data will be used, the location of the existing impedance data may be identified (operation 1004). For example, without limitation, the location of the existing impedance data may be the location of a file in a data processing system containing the existing impedance data. The existing impedance data may be experimental data or previously generated simulation data. The existing impedance data then may be retrieved from the identified location (operation 1006).

If existing impedance data will not be used, impedance data may be generated by simulation (operation 1008). The generated impedance data may be stored (operation 1010). Plots of the impedance data may be displayed (operation 1012) following operations 1006 and 1012.

It then may be determined whether a stability analysis is to be performed (operation 1014). If a stability analysis will not be performed the process may terminate. Otherwise, the stability analysis may be performed using the impedance data (operation 1016) with the process terminating thereafter. For example, operation 1016 may include characterizing a stability profile of an electrical power system as a function of the impedance data. The stability profile may be used to identify source elements and load elements to control power generation by the electrical power system to optimize the stability of the electrical power system.

Figure 11:
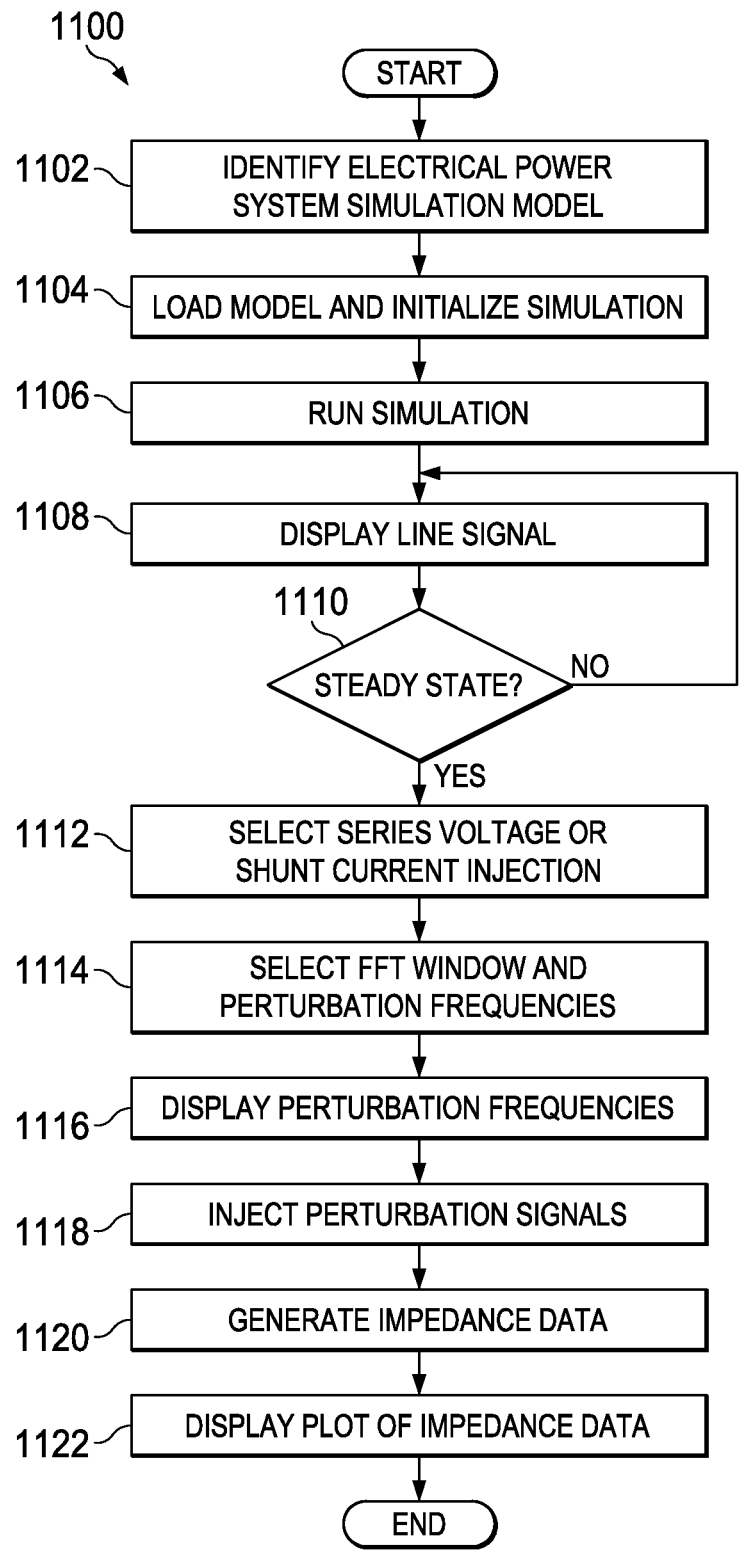
FIG. 11 is an illustration of a flowchart of a process for impedance identification from simulation in accordance with an illustrative embodiment.

Turning now to FIG. 11, an illustration of a flowchart of a process for impedance identification from simulation is depicted in accordance with an illustrative embodiment. In this example, process 1100 is an example of one implementation of a process for implementing operation 1008 in FIG. 10. For example, this process may be implemented in impedance identifier 300 in FIG. 3.

The process may begin by identifying an electrical power system simulation model of the electrical power system for which impedance data is to be generated (operation 1102). The model may be loaded and the simulation initialized (operation 1104). The simulation then may be run (operation 1106).

A line signal from the running simulation may be displayed (operation 1108). The display of the line signal may be used to determine whether the simulation has reached steady state (operation 1110). If the simulation has not reached steady state, the process may return to operation 1108 and the line signal may continue to be displayed until the simulation reaches steady state.

When it is determined that the simulation has reached steady state, series voltage or shunt current injection in the simulation may be selected (operation 1112). A Fast Fourier transform window and perturbation frequencies may be selected (operation 1114). The perturbation frequencies may be displayed (operation 1116). Perturbations signals may be injected in the simulation (operation 1118). Impedance data may be generated (operation 1120). A plot of the impedance data may be displayed (operation 1122), with the process terminating thereafter.

Figure 12:
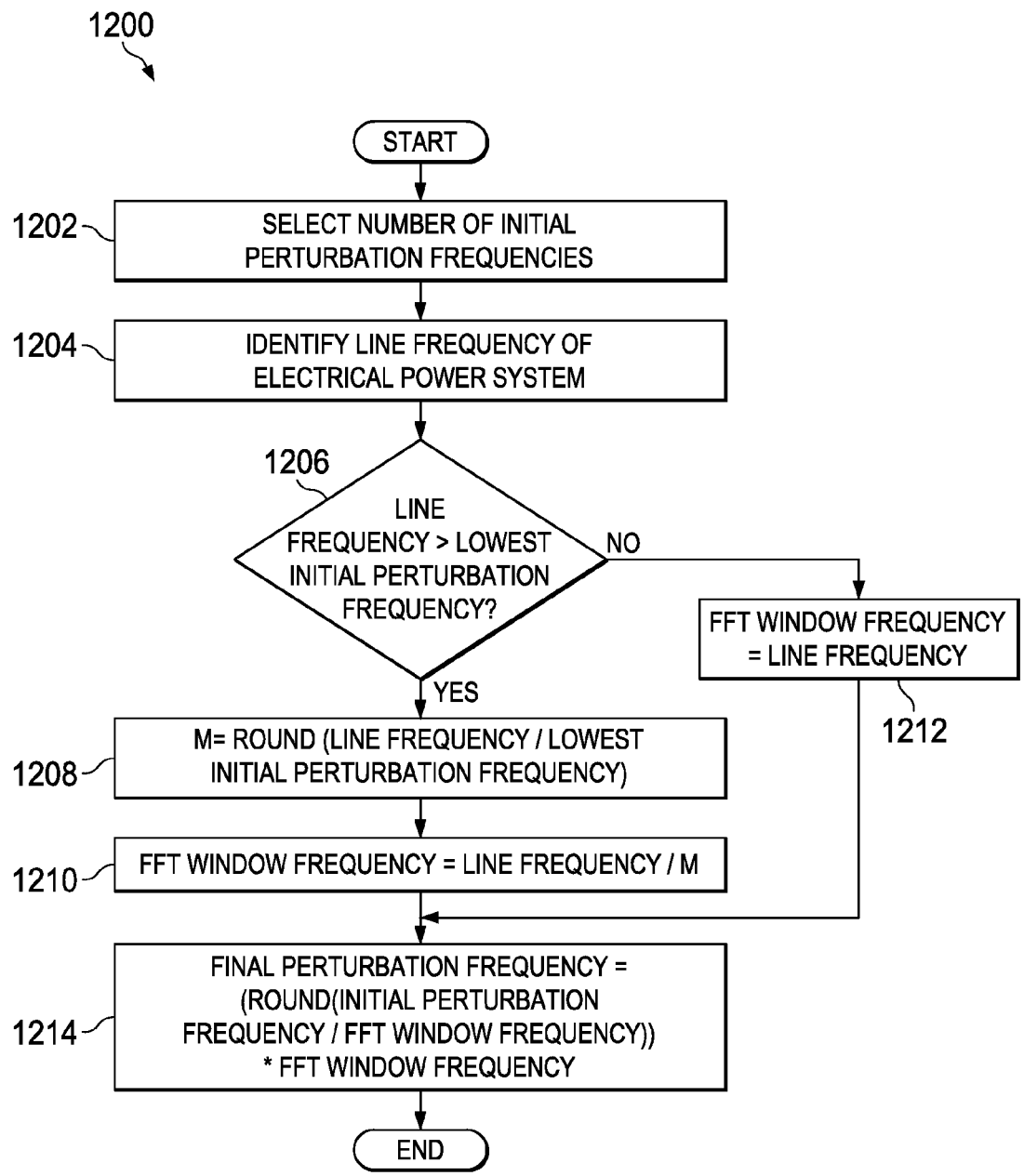
FIG. 12 is an illustration of a flowchart of a process for selecting a Fast Fourier transform window and perturbation frequencies in accordance with an illustrative embodiment.

Turning now to FIG. 12, an illustration of a flowchart of a process for selecting a Fast Fourier transform window and perturbation frequencies is depicted in accordance with an illustrative embodiment. In this example, process 1200 is an example of one implementation of operation 1114 in FIG. 11.

A Fast Fourier transform implicitly assumes that a signal repeats itself after the measurement period over which the transform is determined. In reality, signals are of time-limited nature and nothing is known about the signal beyond the measured interval. If the measurement time is an integral multiple of the signal period, then there is no distortion in the frequency domain representation. However, if the measurement time is not a multiple of the signal period there may be spectral leakage and the resulting frequency spectrum may not be correct.

To avoid the spectral leakage effect, the measurement time for the Fast Fourier transform used for generating impedance data by simulation in accordance with an illustrative embodiment, referred to herein as the Fast Fourier transform window ($T_{FFT\_window}$), may be selected to be a multiple of all the periods of the various signal components. In addition to the perturbation frequency, there are also line-frequency components at alternating current interfaces. Therefore, the Fast Fourier transform window may be selected to contain an integer number of line periods and of all the perturbation periods. That is, $T_{FFT\_window}=m*T_{line}=n*T_{pert}$, where $T_{line}$ is the line period, $T_{pert}$ the perturbation period, m and n integer values.

If the Fast Fourier transform window is selected to be periodical for the line frequency components and perturbation frequency components, the Fast Fourier transform window may be undesirably long in some cases. For example, if the perturbation frequency is 121 Hz, and the line frequency is 60 Hz, in order to be periodical for both frequency components, the frequency of the Fast Fourier transform window should be 1 Hz, which contains 121 perturbation periods and 60 line-frequency periods. A better option is to slightly move the perturbation frequency to 120 Hz. In this case, the frequency for the Fast Fourier transform window may be selected to be 60 Hz, which contains one line-frequency period and two perturbation periods.

In accordance with an illustrative embodiment, perturbation frequencies may be shifted slightly from original selected values to reduce the simulation time. The frequency resolution $f_{resolution}$ is defined as the smallest distance allowed for moving the perturbation frequencies from their original values. Process 1200 implements an algorithm that imposes $T_{FFT\_window}=m*T_{line}=n*T_{pert}$ and shifts initial perturbation frequencies, within the $f_{resolution}$ value, to keep the Fast Fourier transform window to the smallest size. These provisions also ensure precise impedance estimation under unbalanced and distorted conditions.

The process begins by selecting a number of initial perturbation frequencies (operation 1202) and identifying a line frequency of the electrical power system simulation (operation 1204). It then may be determined whether the line frequency is greater than the lowest initial perturbation frequency (operation 1206).

If the line frequency is greater than the lowest initial perturbation frequency, an integer value m may be calculating by rounding the line frequency divided by the lowest initial perturbation frequency (operation 1208). The Fast Fourier transform window frequency then may be set equal to the line frequency divided by the value m (operation 1210). If the line frequency is not greater than the lowest initial perturbation frequency, the Fast Fourier transform window frequency may be set equal to the line frequency (operation 1212).

Following either operation 1210 or operation 1212, a final perturbation frequency may be set equal to the Fast Fourier transform window frequency multiplied by the rounded value of the initial perturbation frequency divided by the Fast Fourier transform window frequency (operation 1214), with the process terminating thereafter. Operation 1214 may be repeated for each of the number of initial perturbation frequencies selected in operation 1202 to determine a number of final perturbation frequencies to be used in the simulation.

Figure 13:
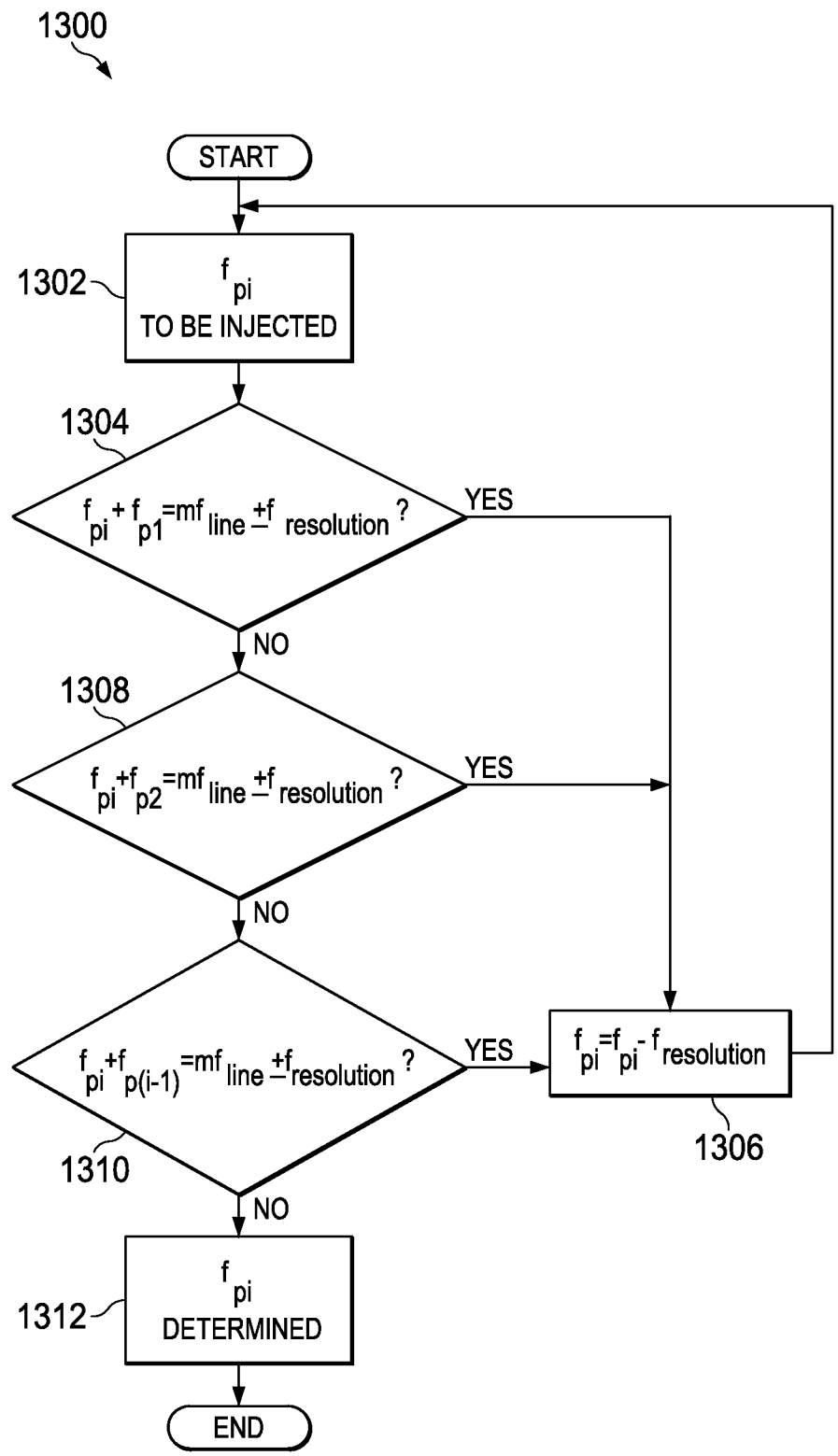
FIG. 13 is an illustration of a flowchart of a process for selecting perturbation frequencies to avoid overlapping perturbation frequencies in a multi-tone signal in accordance with an illustrative embodiment.

Turning now to FIG. 13, an illustration of a flowchart of a process for selecting perturbation frequencies to avoid overlapping perturbation frequencies in a multi-tone signal is depicted in accordance with an illustrative embodiment. Process 1300 is one example of a process for selecting perturbation frequencies to avoid overlapping perturbation frequencies in a multi-tone signal. Processes other than process 1300 may be used to select perturbation frequencies to avoid overlapping perturbation frequencies in a multi-tone signal in different illustrative embodiments.

In the multi-tone approach, the perturbation signals of multiple frequencies are injected at the same time. In this case, the frequency components of the perturbation frequencies may overlap, which may affect the impedance results. For example, in the case in which two perturbation frequencies of 240 Hz and 1360 Hz are injected at the same time, and the line frequency is 400 Hz, the spectrum may show a 640 Hz component that is the overlap of two splitting frequencies, 400 Hz+240 Hz and 2000 Hz−1360 Hz.

The highest perturbation frequency may be limited to less than twice the line frequency to avoid overlapping, but this would be a limitation for the frequency measurement range. Process 1300 implements an algorithm to improve the multi-tone approach while enabling it to measure above twice the value of the line frequency.

To get the same results from the multi-tone and single-tone approaches, the effect of overlapping perturbation frequencies should be avoided. If the measurement frequency range is lower than twice the value of the line frequency, it could be shown that there will be no overlapping, and the multi-tone approach could give the same results as the single-tone approach. If the measurement frequency range is not limited, it will be possible for the perturbation frequencies to overlap. An iterative algorithm is developed to avoid this effect.

The criterion for overlapping perturbation frequencies is defined as the sum of two perturbation frequencies as the multiple of the line frequency:

$$f_{p1}+f_{p2}=mf_{line} \pm f_{resolution}$$

where m=0, 1, 2 . . . ∞.

Before perturbation frequency $f_{pi}$ to be injected (operation 1302) is determined, it may be checked against the criterion along with all the perturbation frequencies lower than $f_{pi}$ (operations 1304, 1308, and 1310). If $f_{pi}$ overlaps with any of the other perturbation frequencies, it may be adjusted by the Fast Fourier transform resolution frequency $f_{resolution}$, (operation 1306) before $f_{pi}$ is determined (operation 1312), with the process terminating thereafter. Process 1300 may be repeated until no more perturbation frequencies overlap.

Figure 14:
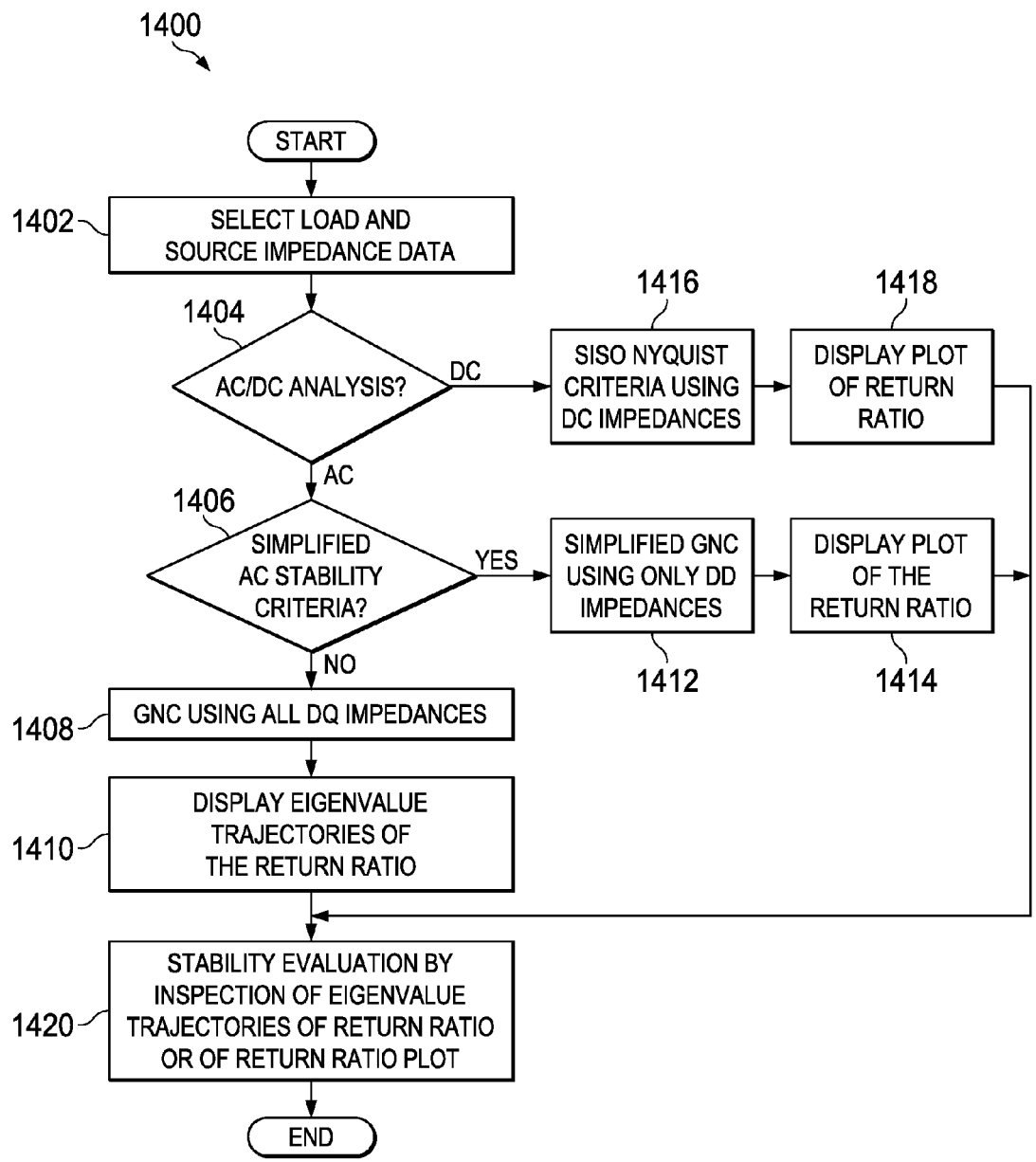
FIG. 14 is an illustration of a flowchart of a process for stability analysis in accordance with an illustrative embodiment.

Turning now to FIG. 14, an illustration of a flowchart of a process for stability analysis is depicted in accordance with an illustrative embodiment. In this example, process 1400 may be implemented, for example, in stability analyzer 400 in FIG. 4.

The process may begin by selecting load and source impedance data (operation 1402). The selected load and source impedance data may be generated from experiment or simulation. It then may be determined whether the analysis is for an AC system or for a DC system (operation 1404).

If the analysis is for an AC system, it may be determined whether simplified AC stability criteria may be used (operation 1406). If simplified AC stability criteria may not be used, generalized Nyquist criteria using all dq impedances may be used (operation 1408) and the eigenvalue trajectories of the return ratio may be displayed (operation 1410). If simplified AC stability criteria may be used, simplified generalized Nyquist criteria using only dd impedances may be used (operation 1412) and a plot of the return ratio may be displayed (operation 1414).

If it is determined at operation 1404 that the analysis is for a DC system, single-input-single-output Nyquist criteria using DC impedances may be used (operation 1416) and a plot of the return ratio may be displayed (operation 1418). Stability evaluation may be performed by inspecting the eigenvalue trajectories of the return ratio or of the return ratio plot (operation 1420) following operation 1410, 1414, or 1418, with the process terminating thereafter.

Figure 15:
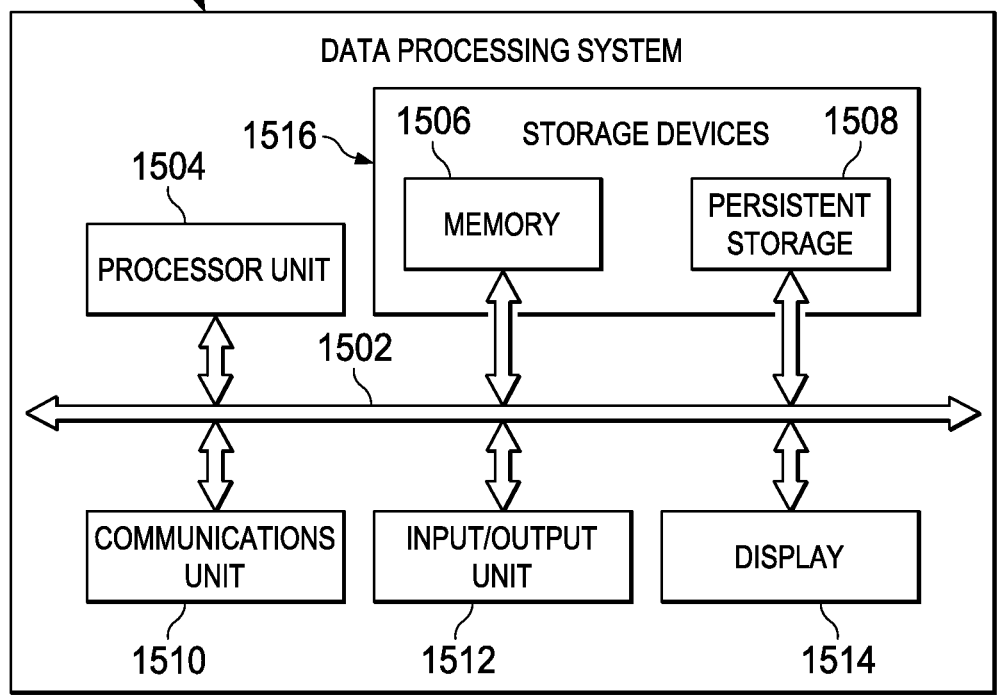
FIG. 15 is an illustration of a block diagram of a data processing system in accordance with an illustrative embodiment.

Turning now to FIG. 15, an illustration of a block diagram of a data processing system is depicted in accordance with an illustrative embodiment. In this example, data processing system 1500 is an example of one implementation of a data processing system for implementing stability analysis system 200 in FIG. 2.

In this illustrative example, data processing system 1500 includes communications fabric 1502. Communications fabric 1502 provides communications between processor unit 1504, memory 1506, persistent storage 1508, communications unit 1510, input/output (I/O) unit 1512, and display 1514. Memory 1506, persistent storage 1508, communications unit 1510, input/output (I/O) unit 1512, and display 1514 are examples of resources accessible by processor unit 1504 via communications fabric 1502.

Processor unit 1504 serves to run instructions for software that may be loaded into memory 1506. Processor unit 1504 may be a number of processors, a multi-processor core, or some other type of processor, depending on the particular implementation. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and other suitable information either on a temporary basis or a permanent basis. Storage devices 1516 also may be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program instructions, program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526.

Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code. As one example, data processing system 1500 may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system.

Additionally, communications unit 1510 may include a number of devices that transmit data, receive data, or both transmit and receive data. Communications unit 1510 may be, for example, a modem or a network adapter, two network adapters, or some combination thereof. Further, a memory may be, for example, memory 1506, or a cache, such as that found in an interface and memory controller hub that may be present in communications fabric 1502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an electrical power system simulator comprising a processor unit configured to generate impedance data from an electrical power system simulation model of an electrical power system comprising source elements and load elements;
        wherein the impedance data identifies an impedance of the electrical power system;
        wherein the electrical power system is characterized by a line frequency at an interface between the source elements and the load elements;
        wherein the electrical power system simulator is configured to inject, at the interface as a series voltage or a shunt current, perturbation signals at a plurality of perturbation frequencies in the electrical power system simulation model;
        wherein the plurality of perturbation frequencies are based on a selection of a plurality of initial perturbation frequencies;
        wherein the electrical power system simulator is configured to use a Fast Fourier transform to generate the impedance data, wherein the Fast Fourier transform is calculated over a window of time;
        wherein the plurality of perturbation frequencies are selected such that the line frequency and the plurality of perturbation frequencies are integer multiples of a frequency of the window;
        wherein the frequency of the window is the frequency having a period that is substantially equal to a period of time over which the Fast Fourier transform is conducted; and
        wherein the plurality of perturbation frequencies are selected by repeatedly:
            identifying overlapping perturbation frequencies by checking if a first perturbation frequency in the plurality of perturbation frequencies overlaps with a second perturbation frequency in the plurality of perturbation frequencies such that the sum of the first and second perturbation frequencies is not a multiple of the line frequency; and
            removing the overlapping perturbation frequencies from the plurality of perturbation frequencies;
    a user interface in communication with the electrical power system simulator, wherein the user interface includes a perturbation frequency display indicating the perturbation frequencies to be injected, and is configured to select the series voltage or the shunt current, and the plurality of initial perturbation frequencies to be injected in the electrical power system simulation model; and
    a stability analyzer in communication with the electrical power system simulator and configured to characterize a stability profile of the electrical power system as a function of the impedance data, wherein the stability profile identifies the source elements and the load elements to control power generation by the electrical power system to optimize stability of the electrical power system.

2. The apparatus of claim 1, wherein the electrical power system simulator is configured to:
    identify the line frequency;
    select the frequency of the window such that the line frequency is an integer multiple of the frequency of the window; and
    adjust the plurality of initial perturbation frequencies to provide the plurality of perturbation frequencies.

3. The apparatus of claim 1, wherein:
    the electrical power system simulator is configured to inject the perturbation signals at the plurality of perturbation frequencies in the electrical power system simulation model to generate the impedance data; and
    the perturbation signals are selected from single-tone signals and a multi-tone signal, wherein the multi-tone signal comprises the plurality of perturbation frequencies.

4. The apparatus of claim 3, wherein the plurality of perturbation frequencies are selected such that the plurality of perturbation frequencies in the multi-tone signal do not overlap.

5. The apparatus of claim 1, wherein the stability analyzer is configured to characterize the stability profile of the electrical power system using criteria selected from generalized Nyquist criteria, a simplified form of generalized Nyquist criteria, and Nyquist criteria applied to single-input-single-output systems.

6. The apparatus of claim 1, wherein the stability analyzer is further configured to characterize the stability profile of an electrical power system as a function of impedance measurement data for the electrical power system.

7. A method for electrical power system stability optimization, the method comprising:
   simulating an electrical power system comprising source elements and load elements to generate impedance data;
     wherein the impedance data identifies an impedance of the electrical power system;
     wherein the electrical power system is characterized by a line frequency at an interface between the source elements and the load elements;
   injecting, at the interface as a series voltage or a shunt current, perturbation signals at a plurality of perturbation frequencies in an electrical power system simulation model of the electrical power system;
     wherein the plurality of perturbation frequencies are based on a selection of a plurality of initial perturbation frequencies;
   using a Fast Fourier transform to generate the impedance data, wherein the Fast Fourier transform is calculated over a window of time; and
   selecting the plurality of perturbation frequencies such that the line frequency and the plurality of perturbation frequencies are integer multiples of a frequency of the window;
     wherein the frequency of the window is the frequency having a period that is substantially equal to a period of time over which the Fast Fourier transform is conducted; and
     wherein the plurality of perturbation frequencies are selected by repeatedly:
       identifying overlapping perturbation frequencies by checking if a first perturbation frequency in the plurality of perturbation frequencies overlaps with a second perturbation frequency in the plurality of perturbation frequencies such that the sum of the first and second perturbation frequencies is not a multiple of the line frequency; and
       removing the overlapping perturbation frequencies from the plurality of perturbation frequencies;
   selecting, using a user interface including a perturbation frequency display indicating the perturbation frequencies to be injected, the series voltage or the shunt current, and the plurality of initial perturbation frequencies to be injected in the electrical power system simulation model; and
   characterizing a stability profile of the electrical power system as a function of the impedance data, wherein the stability profile identifies the source elements and load elements to control power generation by the electrical power system to optimize stability of the electrical power system.

8. The method of claim 7, wherein selecting the plurality of perturbation frequencies comprises:
   identifying the line frequency;
   selecting the frequency of the window such that the line frequency is an integer multiple of the frequency of the window; and
   adjusting the plurality of initial perturbation frequencies to provide the plurality of perturbation frequencies.

9. The method of claim 7, wherein simulating the electrical power system comprises:
   selecting the perturbation signals from a plurality of single-tone signals and a multi-tone signal, wherein the multi-tone signal comprises the plurality of perturbation frequencies.

10. The method of claim 9 further comprising:
    selecting the plurality of perturbation frequencies such that the plurality of perturbation frequencies in the multi-tone signal do not overlap.

11. The method of claim 7, wherein characterizing the stability profile of the electrical power system comprises characterizing the stability profile of the electrical power system using criteria selected from generalized Nyquist criteria, a simplified form of generalized Nyquist criteria, and Nyquist criteria applied to single-input-single-output systems.

12. The method of claim 7 further comprising characterizing the stability profile of an electrical power system using impedance measurement data for the electrical power system.

13. A method for identifying an impedance of an electrical power system, comprising:
    simulating, by a processor unit, the electrical power system comprising source elements and load elements;
      wherein the electrical power system is characterized by a line frequency at an interface between the source elements and the load elements, and comprising injecting, at the interface as a series voltage or a shunt current, perturbation signals at a plurality of perturbation frequencies in an electrical power system simulation model of the electrical power system;
      wherein the plurality of perturbation frequencies are based on a selection of a plurality of initial perturbation frequencies;
    generating impedance data, by the processor unit, using a Fast Fourier transform;
      wherein the Fast Fourier transform is calculated over a window of time; and
      wherein the impedance data identifies the impedance of the electrical power system;
    selecting, using a user interface including a perturbation frequency display indicating the perturbation frequencies to be injected, the series voltage or the shunt current, and the plurality of initial perturbation frequencies to be injected in the electrical power system simulation model; and
    selecting, by the processor unit, the plurality of perturbation frequencies such that the line frequency and the plurality of perturbation frequencies are integer multiples of a frequency of the window;
      wherein the frequency of the window is the frequency having a period that is substantially equal to a period of time over which the Fast Fourier transform is conducted; and
      wherein the plurality of perturbation frequencies are selected by repeatedly:
        identifying overlapping perturbation frequencies by checking if a first perturbation frequency in the plurality of perturbation frequencies overlaps with a second perturbation frequency in the plurality of perturbation frequencies such that the sum of the first and second perturbation frequencies is not a multiple of the line frequency; and removing the overlapping perturbation frequencies from the plurality of perturbation frequencies.

14. The method of claim 13 further comprising:
identifying the line frequency;
selecting the frequency of the window such that the line frequency is an integer multiple of the frequency of the window; and
adjusting the plurality of initial perturbation frequencies to provide the plurality of perturbation frequencies.

15. The method of claim 13, wherein the perturbation signals are selected from a plurality of single-tone signals and a multi-tone signal, wherein the multi-tone signal comprises the plurality of perturbation frequencies.

16. The method of claim 15 further comprising:
selecting the plurality of perturbation frequencies such that the plurality of perturbation frequencies in the multi-tone signal do not overlap.

17. The method of claim 13 further comprising:
characterizing a stability profile of the electrical power system as a function of the impedance data, wherein the stability profile identifies the source elements and load elements to control power generation by the electrical power system to optimize stability of the electrical power system.

18. The method of claim 17, wherein characterizing the stability profile of the electrical power system comprises characterizing the stability profile of the electrical power system using criteria selected from generalized Nyquist criteria, a simplified form of generalized Nyquist criteria, and Nyquist criteria applied to single-input-single-output systems.

19. A system for optimizing an electrical power system on an aircraft, comprising:
an electrical power simulator comprising a processor and memory configured to implement an impedance identifier configured to generate impedance data for the electrical power system on the aircraft;
  wherein the electrical power system on the aircraft comprises source elements and load elements;
  wherein the impedance data identifies an impedance of the electrical power system on the aircraft;
  wherein the electrical power system is characterized by a line frequency at an interface between the source elements and the load elements;
  wherein the electrical power system simulator is configured to inject, at the interface as a series voltage or a shunt current, perturbation signals at a plurality of perturbation frequencies in the electrical power system simulation model;
  wherein the plurality of perturbation frequencies are based on a selection of a plurality of initial perturbation frequencies;
  wherein the electrical power system simulator is configured to use a Fast Fourier transform to generate the impedance data;
  wherein the Fast Fourier transform is calculated over a window of time;
  wherein the plurality of perturbation frequencies are selected such that the line frequency and the plurality of perturbation frequencies are integer multiples of a frequency of the window; and
  wherein the frequency of the window is the frequency having a period that is substantially equal to a period of time over which the Fast Fourier transform is conducted; and
  wherein the plurality of perturbation frequencies are selected by repeatedly:
    identifying overlapping perturbation frequencies by checking if a first perturbation frequency in the plurality of perturbation frequencies overlaps with a second perturbation frequency in the plurality of perturbation frequencies such that the sum of the first and second perturbation frequencies is not a multiple of the line frequency; and
    removing the overlapping perturbation frequencies from the plurality of perturbation frequencies;
a user interface in communication with the electrical power system simulator, wherein the user interface includes a perturbation frequency display indicating the perturbation frequencies to be injected, and is configured to select the series voltage or the shunt current, and the plurality of initial perturbation frequencies to be injected in the electrical power system simulation model; and
a stability analyzer in communication with the impedance identifier and configured to characterize a stability profile of the electrical power system on the aircraft as a function of the impedance data;
  wherein the stability profile identifies the source elements and load elements to control power generation by the electrical power system on the aircraft to optimize stability of the electrical power system on the aircraft.

20. The system of claim 19, wherein the impedance identifier comprises an electrical power system simulator configured to generate the impedance data from an electrical power system simulation model of the electrical power system on the aircraft.

21. The system of claim 19, wherein the stability analyzer is configured to characterize the stability profile of the electrical power system on the aircraft as a function of impedance measurement data for the electrical power system on the aircraft.

* * * * *